Patented May 15, 1951

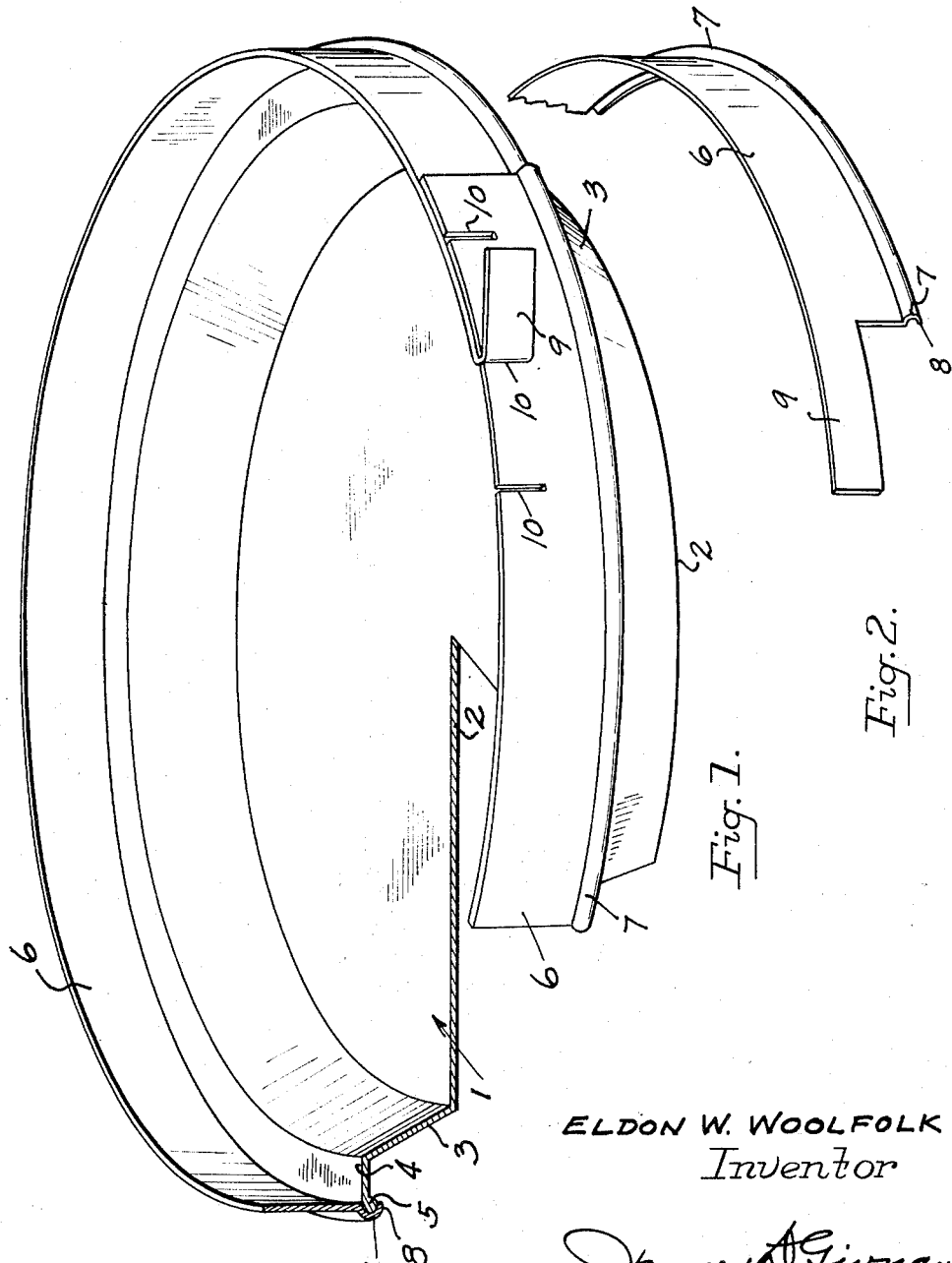

2,552,702

UNITED STATES PATENT OFFICE 2,552,702

PIEPAN SEAL

Eldon W. Woolfolk, Portland, Oreg.

Application September 11, 1946, Serial No. 696,324

1 Claim. (Cl. 220—4)

This invention relates to improvements in baking pans, pie pans and the like, and more particularly to means for increasing the depth of the pan, and at the same time providing an enlarged side wall or retaining wall for the pan to prevent any leakage or overrun of the ingredients of a pie over the edges of the conventional baking pan or pie pan.

The principal object of the invention is the provision of an additional side wall for a pan which may be readily adjusted and quickly and conveniently secured to pans of various sizes and diameters.

A further object of the invention is the provision of means extending below the rim of the pan to provide convenient gripping means for a hot pan immediately following the baking operation.

A still further object is the provision of a retaining wall and gripping means of this character which is prepared in rolls ready for use and properly formed to be well fitted into gripping contact with the edges of the pan and which will shrink at oven heat to more securely grip the pan and to thereby prevent leakage of any liquid or other substances from the pie over the edges of the pan.

These and other objects will appear as my invention is more fully hereinafter described in the following specification, illustrated in the accompanying drawing, and finally pointed out in the appended claim.

In the drawing:

Figure 1 is a perspective view of a baking pan with a fragment broken away and showing my new and improved retaining wall in operative engagement therewith.

Figure 2 is a fragmentary detail view showing a locking tongue formed at one end of the wall.

Referring now more particularly to the drawing:

Reference numeral 1 indicates generally a pie pan or baking pan having a bottom 2 and upwardly and outwardly inclined side wall 3 terminating in an annular flange 4 having a rolled or beaded edge 5.

The retaining wall comprises a strip of paper 6, or other suitable material of suitable thickness to provide a wall of required stiffness. The bottom marginal portion of the wall is partially rolled as at 7 to conform generally to the rolled edge 5 of the pan. The rolled portion of the wall extends below the rolled edge of the pan and inwardly with respect thereto to provide a gripping portion 8 so that a user may handle a hot pan without danger of getting burned.

One end of the wall is reduced in depth, as shown in Figure 2, to form a projection or locking tongue 9. The opposite end portion of the wall is formed with a plurality of vertical slots 10 extending to a depth equal to the width of the tongue. Any number of slots may be provided and at any desired spacing.

The wall is applied to and drawn tightly around the rim of the pan until the ends of the wall overlap, then the tongue is passed through the nearest slot and bent back against the wall as shown to lock the ends in place and the wall to the pan.

While I have shown a particular form of embodiment of my invention, I am aware that many minor changes therein will readily suggest themselves to others skilled in the art without departing from the spirit and scope of the invention. Having thus described the invention, what I claim as new and desire to protect by Letters Patent is:

A retaining wall for a baking pan having a rolled edge, said wall comprising a band of flexible material adapted to surround the pan and to overlap at its ends, the lowermost edges of the band being partially rolled to form a channel to embrace the rolled edges of the baking pan, one end of the band being formed with an integral extension of one-half the height of the band to form a horizontal locking tongue, a plurality of spaced apart vertical slots formed in the opposite end of said band extending downwardly from the upper edge thereof to a depth equal to one-half the height of the said band and adapted to selectively receive said tongue for locking the ends of the band together and whereby the overlapping bottom halves of the ends of the bands form a seal by uninterrupted surface to surface contact by engagement of the tongue with said slots.

ELDON W. WOOLFOLK.

REFERENCES CITED

The following references are of record in the file of this patent:

UNITED STATES PATENTS

| Number | Name | Date |
|---|---|---|
| 1,673,947 | Paddison | June 19, 1928 |
| 1,734,328 | Conry | Nov. 5, 1929 |
| 1,768,954 | Henning | July 1, 1930 |
| 1,779,335 | Remrey | Oct. 21, 1930 |
| 1,980,843 | Andrews | Nov. 13, 1934 |
| 2,078,891 | Kowal | Apr. 27, 1937 |
| 2,326,545 | McCarthy | Aug. 10, 1943 |